H. L. BURR.
GASKET AND SCREEN COMBINATION.
APPLICATION FILED AUG. 21, 1917.
1,276,171. Patented Aug. 20, 1918.
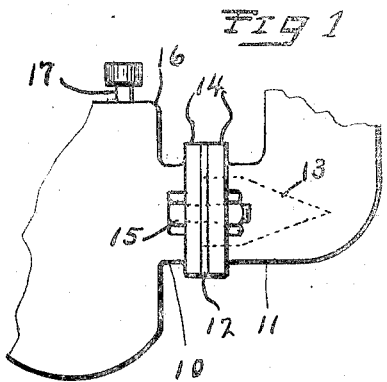
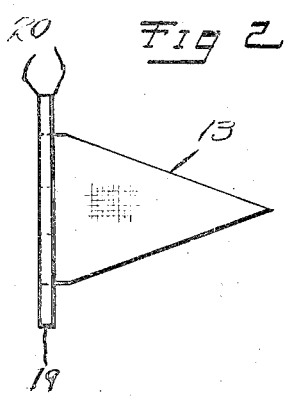
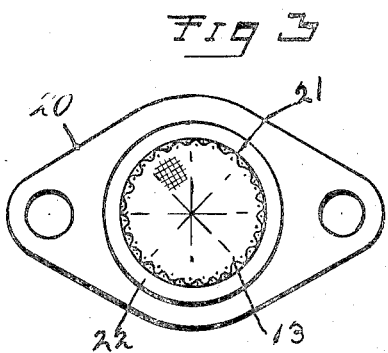
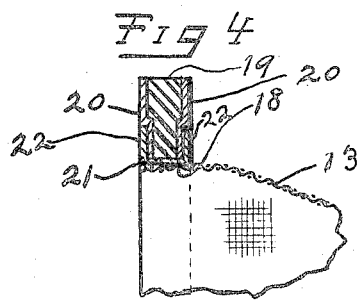
Inventor:
Harold Lester Burr,
By Louis M. Schmidt.
Atty.

UNITED STATES PATENT OFFICE.

HAROLD LESTER BURR, OF MIDDLETOWN, CONNECTICUT.

GASKET AND SCREEN COMBINATION.

1,276,171.  Specification of Letters Patent.  Patented Aug. 20, 1918.

Application filed August 21, 1917. Serial No. 187,458.

*To all whom it may concern:*

Be it known that I, HAROLD LESTER BURR, a citizen of the United States, residing at Middletown, in the county of Middlesex and State of Connecticut, have invented certain new and useful Improvements in Gasket and Screen Combinations, of which the following is a specification.

My invention relates to improvements in gasket and screen combinations, and the object of my improvement is to produce a device that is adapted to be positioned between the carbureter and intake manifold of an internal combustion engine, particularly for use in automobiles, and that prevents other than fine particles of liquid fuel being admitted to the said manifold, and thereby avoiding waste of fuel, such as occurs when fuel in relatively large drops is admitted, such as happens without the provision of a device such as is to be described, and which device is, furthermore, incorporated with a part that is in common use as a part of the engine connections, so that, effectively, only the usual number of parts are supplied for assembling the engine.

In the accompanying drawing:—

Figure 1 is a side elevation of part of an engine connection comprising my improved gasket and screen combination interposed between the carbureter and the inlet manifold of an internal combustion engine.

Fig. 2 is a side elevation, on an enlarged scale, of the gasket and screen combination.

Fig. 3 is an end elevation of the same.

Fig. 4 is a sectional view of the same.

The engine connections shown in the drawing are such as used in an automobile of well known make, that at the left, as shown in Fig. 1, being the outlet 10 of the carbureter, that at the right being the inlet 11 of the supply fuel manifold, and between these parts is a gasket 12 of precisely the usual and ordinary form, which, however, in the present case, besides serving in accordance with the usual function as a gasket, also serves as the supporting means for an additional element in the form of a screen 13, which, as a detail, is of special form.

The outlet 10, on the side toward the gasket 12, is provided with a flange 14 having holes for a pair of connecting bolts 15, the inlet 11 has a similar flange 14, and the gasket 12 fits between the flanges 14. The outlet 10 on the side remote from the flange 14 connects with a housing 16 for a butterfly valve of usual form, mounted on the shaft 17, the said outlet 10 being relatively short, so that the butterfly valve mentioned is quite close to the flange 14.

The screen 13 is elongated, and, as shown, is of conical form, is made of wire gauze of fine mesh, and is secured by the large end by soldering or in any approved manner to the border wall of the opening in the gasket 12.

The gasket 12 I find to be well adapted to serve as the support for the screen 13 because of the fact that the border wall portion 18 is made of metal, the same being part of a metal sheathing that is provided for inclosing an inner body portion 19 of asbestos, that constitutes the gasket proper.

In detail, the gasket 12 comprises the inner body portion 19 at the middle, which, as mentioned, is made of asbestos, and a facing 20 of thin brass on the two sides, and as a holding device for the brass end faces 20 there is provided a sleeve or thimble device 21 of thin copper, consisting of the portion 18 that serves as the border wall of the opening and flanges or heads 22 at the ends that bear against the opposed portions of the brass end faces 20.

Because of the fact that the screen 13 is of appreciable length and of the further fact that the butterfly valve mounted on the shaft 17 is close to the flange connection 14 and to the openings in the flanges connections 14 and the gasket 12, in order to avoid obstructing the free operation of the valve I position the gasket and screen combination so that the screen 13 is housed in manifold inlet portion 11 of the engine connection.

By making the screen 13 elongated, as shown, I provide ample openings for the passage of fuel, so that there is practically no interference with the fuel supply.

I claim as my invention:—

A gasket and screen combination comprising a gasket portion having a middle opening and a screen bridging the said opening, the said gasket portion being a composite structure having a body portion of fibrous material and a sheathing portion of thin sheet metal, the said sheathing portion generally inclosing the said body portion and having a thimble part that extends through the said opening so as to form the border wall thereof, and the said screen being secured to and supported by the said thimble part of the sheathing.

HAROLD LESTER BURR.

Witnesses:
 D. WARD NORTHROP,
 CARL F. ANDERSON.